(No Model.) 2 Sheets—Sheet 1.
G. F. PAGE.
MACHINE BELTING.
No. 385,682. Patented July 3, 1888.
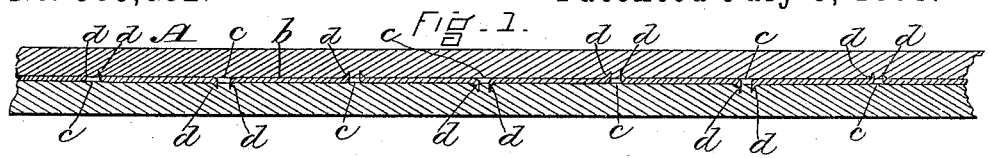
Fig. 1.
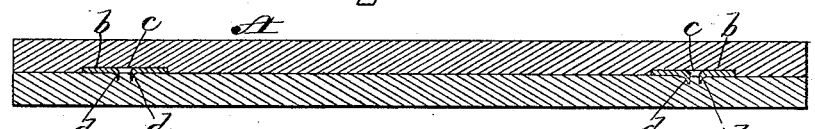
Fig. 2.
Fig. 3.
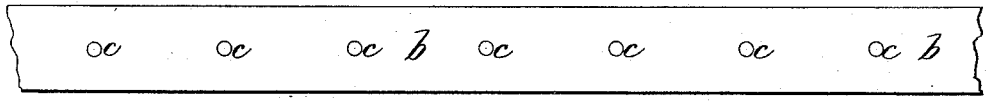
Fig. 4.
Fig. 5.
Fig. 6.
Fig. 7.
Fig. 8.
WITNESSES
Edwin H. Edgett,
F. Vanderers Hayden,
INVENTOR
George F. Page
By Westermacher
Atty.
N. PETERS, Photo-Lithographer, Washington, D. C.

(No Model.) 2 Sheets—Sheet 2.
G. F. PAGE.
MACHINE BELTING.
No. 385,682. Patented July 3, 1888.
Fig-9-
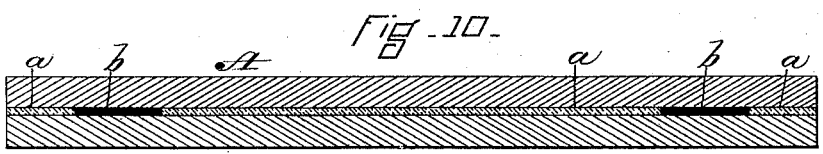
Fig-10-
Fig 11
Fig-12-
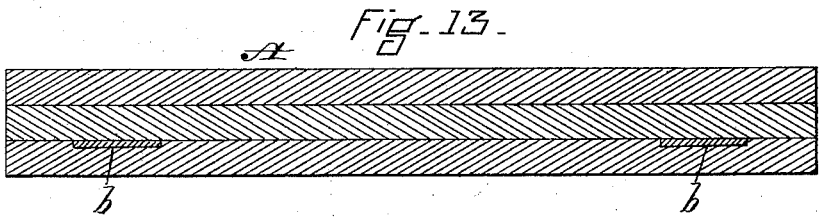
Fig-13-
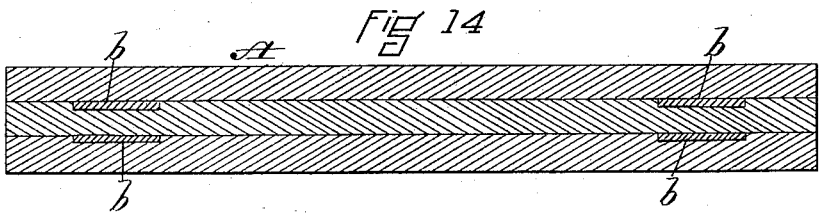
Fig 14
WITNESSES
Edwin F. Edgett
F. Vanderen Hayden
INVENTOR
George F. Page
By O. E. Teschemacher
Atty.
N. PETERS, Photo-Lithographer, Washington, D. C.

UNITED STATES PATENT OFFICE.

GEORGE F. PAGE, OF CONCORD, NEW HAMPSHIRE.

MACHINE-BELTING.

SPECIFICATION forming part of Letters Patent No. 385,632, dated July 3, 1888.

Application filed November 14, 1887. Serial No. 255,177. (No model.)

*To all whom it may concern:*

Be it known that I, GEORGE F. PAGE, a citizen of the United States, residing at Concord, in the county of Merrimac and State of New Hampshire, have invented certain Improvements in Machine-Belting, of which the following is a full, clear, and exact description, reference being had to the accompanying drawings, making part of this specification, in which—

Figure 1 is a longitudinal vertical section through a piece of belting constructed in accordance with my invention. Fig. 2 is a transverse vertical section of the same. Fig. 3 is a similar section showing the steel strips provided with smoothly-cut holes. Fig. 4 is a plan of one of the steel strips which I employ in the construction of my improved belt. Figs. 5, 6, 7, 8, 9, 10, 11, 12, 13, and 14 are transverse sections through belts embodying my invention.

My invention relates to an improvement in machine-belts composed of one or more thicknesses or layers of leather or other suitable material, combined with one or more strips of steel placed longitudinally of the belt; and my invention consists in a novel construction and combination of parts, as hereinafter set forth and specifically claimed.

In the said drawings, A represents my improved belt, which may be composed of leather or other suitable material and of one or any desired number of thicknesses or layers. Each belt has secured to it in any suitable manner, as hereinafter described, one or more strips, *b*, of tempered steel, said strip or strips extending along the length of the belt, as seen in Fig. 1. The steel strip or strips *b* may be embedded either in whole or in part of the thickness of the steel in the leather or other material of which the belt is composed, where only one thickness of belt material is employed, as seen in Figs. 6 and 7; or a strip or strips of steel may be placed between two thicknesses of leather or other material used for making the belt, as seen in Figs. 1, 2, 3, 9, 11, and 12, in which case it may be simply fastened in place between said thicknesses by means of cement or otherwise, and in such case the steel strip or strips may be embedded partially in each of the two thicknesses of leather or other material, as seen in Fig. 11, or wholly embedded in one of them, as seen in Figs. 3 and 12; or the steel strip or strips may simply be placed between the two thicknesses of material, without being embedded at all in either of them, as seen in Fig. 9; or a third ply or filling, *a*, of leather or other suitable material, may be interposed between the upper and lower thicknesses of which the belt is composed with the strip or strips of steel not embedded at all, as seen in Fig. 10; or the belt may be composed of any desired number of thicknesses of material with the steel strip or strips placed between any two contiguous plies or thicknesses, as seen in Fig. 13, or between all of them, as seen in Fig. 14, or between any number of the same; and said strip or strips of steel applied to a belt, as above described, will effectually prevent the belt from stretching in the direction of its length and will avoid all possibility of its becoming crooked or twisted and running unevenly upon the pulleys.

If desired, the strip or strips of steel may be provided with holes *c*, which may either be cut clean, as seen in Fig. 3, or may be broken through to form a projecting burr or burrs, *d*, on the opposite side, as seen in Figs. 1 and 2, and these burrs may be formed on one or both sides of the steel strip, as preferred. These burrs will embed themselves in the leather or other material and assist in holding the strip of steel in place. The strip or strips of steel may be held in place, if desired, by means of rivets when used with a single thickness of belt material, as seen in Fig. 5. Rivets may also be used, if desired, when the belt is composed of more than one thickness, or the strip or strips of steel may be fastened by any other suitable means or left simply in the grooves or channels made for their reception in the leather or other material, or held in place by means of the interposed layer or filling *a*. (Shown in Fig. 10.)

In practice I prefer the following construction, viz: Two or more strips of steel of a spring temper, about five-eighths of an inch wide, (more or less,) of a thin gage so as not to render the belt too stiff, said strips placed between two thicknesses of leather, which form a double belt, the steel strips being provided with holes at a short distance apart, said holes being punched in such manner that the ragged edges or burrs will project alternately upon opposite sides of the strips and be left as projecting ragged points, which embed themselves in both layers or thicknesses of the leather, the burrs of one hole projecting upon one side and the burrs of the next hole projecting upon the opposite side, the steel strips being embedded to their full thickness in one piece or thickness of the leather, by which construction the belt will be made of uniform thickness throughout its length and without ridges on its surface, and will run evenly and smoothly upon the pulleys. The holes in the steel strips will enable the cement used in joining the layers or thicknesses of leather to adhere closely to both pieces of leather, as it will pass through said holes, as seen in Fig. 3, while the steel strips, preferably embedded in the leather and held in place by the burrs, will effectually prevent the belt from stretching or becoming crooked or twisted. If it should be desired to increase the thickness of a belt so made, an additional ply or plies can be added to one or both sides, making a multiple-ply belt of any desired thickness.

What I claim as my invention, and desire to secure by Letters Patent, is—

A driving-belt composed of one or more thicknesses of leather or other suitable material, combined with one or more strips of steel extending lengthwise of the belt, and provided with holes having burrs or ragged edges adapted to enter the leather or other material of which the belt is composed, whereby the steel strip is held securely in place, substantially as set forth.

Witness my hand this 10th day of November, A. D. 1887.

GEO. F. PAGE.

In presence of—
P. E. TESCHEMACHER,
EDWIN F. EDGETT.